United States Patent
Doyle et al.

(10) Patent No.: US 8,754,184 B2
(45) Date of Patent: Jun. 17, 2014

(54) ACCELERATED CURE OF ISOCYANATE TERMINATED PREPOLYMERS

(75) Inventors: Thomas R. Doyle, Wallingford, CT (US); Mark P. Ferrandino, Danbury, CT (US); Ronald O. Rosenberg, Orange, CT (US)

(73) Assignee: Chemtura Corporation, Middlebury, CT (US)

( * ) Notice: Subject to any disclaimer, the term of this patent is extended or adjusted under 35 U.S.C. 154(b) by 146 days.

(21) Appl. No.: 12/913,888

(22) Filed: Oct. 28, 2010

(65) Prior Publication Data

US 2011/0118431 A1    May 19, 2011

Related U.S. Application Data

(60) Provisional application No. 61/261,699, filed on Nov. 16, 2009.

(51) Int. Cl.
*C08G 18/32* (2006.01)
*C08G 18/20* (2006.01)

(52) U.S. Cl.
USPC .......................................................... 528/71

(58) Field of Classification Search
USPC .......................................................... 528/71
See application file for complete search history.

(56) References Cited

U.S. PATENT DOCUMENTS

| | | | |
|---|---|---|---|
| 3,471,423 A | | 10/1969 | Elmer et al. |
| 3,899,438 A | * | 8/1975 | Kalil .................... 252/182.15 |
| 3,900,447 A | * | 8/1975 | van Gulick .............. 525/440.06 |
| 4,075,150 A | * | 2/1978 | Hoeschele .................... 524/871 |
| 4,182,825 A | | 1/1980 | Jackle |
| 4,195,150 A | | 3/1980 | Gajewski et al. |
| 4,282,344 A | | 8/1981 | Caruso |
| 4,330,454 A | * | 5/1982 | Kimball .................... 524/773 |
| 4,521,545 A | | 6/1985 | Kerimis et al. |
| 5,703,193 A | | 12/1997 | Rosenberg et al. |
| 6,953,765 B2 | | 10/2005 | Ooms et al. |
| 2003/0065124 A1 | | 4/2003 | Rosenberg et al. |
| 2003/0134971 A1 | * | 7/2003 | Blount .................... 524/589 |
| 2008/0146765 A1 | * | 6/2008 | Xie et al. .................... 528/64 |
| 2009/0076239 A1 | * | 3/2009 | Xie et al. .................... 528/60 |
| 2010/0256311 A1 | * | 10/2010 | Doyle et al. .................... 525/453 |

FOREIGN PATENT DOCUMENTS

GB         1101410         1/1965

* cited by examiner

*Primary Examiner* — Mike M Dollinger
(74) *Attorney, Agent, or Firm* — George Romanik; Joseph Suaholnik; Chemtura Corp.

(57) ABSTRACT

A prepolymer mixture for preparing a polyurethane elastomer, the mixture comprising an isocyanate terminated prepolymer and a nitrogen-containing organic salt. The nitrogen-containing organic salt may be selected from the group consisting of an ammonium salt, an imidazolium salt, a pyridinium salt, a pyrrolidinium salt, a piperidinium salt, and a morpholinium salt.

8 Claims, No Drawings

ACCELERATED CURE OF ISOCYANATE TERMINATED PREPOLYMERS

This application claims benefit under 35 USC 119(e) of U.S. provisional application No. 61/261,699, filed Nov. 16, 2009, the disclosure of which is incorporated by reference.

FIELD OF THE INVENTION

The present invention relates to polyurethane elastomers, to methods for forming polyurethane elastomers, and to prepolymer mixtures for forming polyurethane elastomers. More specifically, the invention relates to employing nitrogen-containing organic salts to accelerate the reaction between prepolymers and chain extenders to form polyurethane elastomers.

BACKGROUND OF THE INVENTION

Polyurethane elastomers are conventionally prepared by reacting a prepolymer with a chain extender. Typically, the prepolymer comprises the reaction product of a polyol and a diisocyanate monomer with excess molar amounts of the diisocyanate monomer. As such, the isocyanate groups of the diisocyanate "cap" the hydroxy groups of the polyol resulting in an isocyanate terminated prepolymer. The most commonly used prepolymer mixtures utilize diphenylmethane diisocyanate ("MDI") and toluene diisocyanate ("TDI") as the diisocyanate monomer.

The resulting prepolymer is then cured with a chain extender to form the final polyurethane product. The chain extender links multiple diisocyanate monomers to form the resultant polyurethane. Typical chain extenders include aromatic amines such as methylene bis orthochloroaniline ("MOCA"), methylene bis diethylaniline ("MDEA"), methylene bis chlorodiethylaniline ("MCDEA"), and hydroquinone-bis-hydroxyethyl ether ("HQEE"), and 4,4'-methylene-bis(2-chloroaniline) ("MBCA"); and diols, e.g., ethylene glycol ("EG"), diethylene glycol ("DEG"), triethylene glycol ("TEG"), propylene glycol ("PG"), dipropylene glycol ("DPG"), and 1,4-butanediol ("BDO").

Another class of chain extenders is metal salt coordination complexes of methylenedianiline ("MDA"). In these complexes, the MDA is blocked by a reaction with a metal salt to form a coordination complex. Typically, it is necessary to de-block the MDA from the coordination complex before the MDA can effectively chain extend the respective prepolymer. This may be done by applying heat, for example, to a mold that contains the prepolymer and the chain extender.

In some applications, the reaction of the prepolymer and the chain extender takes place too slowly, e.g., the chain extender does not cure, the prepolymer and the polyurethane is not formed, e.g., polymerized, quickly enough. As a result of the slow cure rates, cure temperatures must be increased and/or cycle times must be lengthened, both of which result in decreased productivity. In other applications, the de-blocking of the MDA coordination complex occurs more rapidly at the surface of the heated mold. Thus, the uniformity of the structure of the resultant polyurethane elastomer may not be consistent throughout. As such, a hard skin may first form on the outer surfaces and, as the cure proceeds, the skin may rupture, resulting in an undesirable cracked surface.

Some cure accelerators are known such as glycerol and urea. Such cure accelerators, however, do not work well with all prepolymer/chain extender combinations. In addition, the performance demonstrated by these cure accelerators leaves much room for improvement.

Thus, the need exists for accelerating the reaction between prepolymers and chain extenders in order to increase productivity and to produce polyurethane elastomers, in particular, high performance polyurethane elastomers, that ideally have a substantially uniform consistency.

SUMMARY OF THE INVENTION

In one aspect, the invention relates to a prepolymer mixture comprising an isocyanate terminated prepolymer and a nitrogen-containing organic salt. The isocyanate terminated prepolymer preferably reacts with a chain extender to form an elastomer. The nitrogen-containing compound accelerates the cure rate of the prepolymer/chain extender reaction mixture, as compared to reactions that take place without the nitrogen-containing organic salt. As such, the addition of the nitrogen-containing compound provides for increased productivity and for the production of polyurethane elastomers, e.g., high performance polyurethane elastomers, that have a uniform consistency throughout the elastomer. Preferably, the nitrogen-containing compound is selected from the group consisting of an ammonium salt, an imidazolium salt, a pyridinium salt, a pyrrolidinium salt, a piperidinium salt, and a morpholinium salt.

In another aspect, the invention relates to an elastomer formed using the prepolymer mixtures. The elastomer comprises the reaction product of the isocyanate terminated prepolymer and the chain extender in the presence of the nitrogen-containing organic salt. Due to the addition of the nitrogen-containing organic salt, the resultant elastomer may cure at an improved rate, e.g., at least a 10% improvement, e.g. at least 25% improvement, at least a 40% improvement, at least a 50% improvement, at least a 75% improvement, at least a 100% improvement, or at least a 200% improvement, relative, elastomers prepared without the nitrogen-containing organic salt. Preferably, the chain extender is a metal salt coordination complex, e.g., a methylenedianiline sodium chloride coordination complex.

In another aspect, the invention relates to a method of preparing a polyurethane elastomer. The method comprises the steps of combining the isocyanate terminated prepolymer and the nitrogen-containing organic salt to form the prepolymer mixture; and reacting the prepolymer in the prepolymer mixture with the chain extender to form the polyurethane elastomer. As discussed supra, the reaction of the prepolymer mixture and the chain extender is accelerated due to the inclusion of the nitrogen-containing organic salt. Preferably, the reaction product of the prepolymer and the chain extender is not a foam.

DETAILED DESCRIPTION OF THE INVENTION

Introduction

Typically, polyurethane elastomers are prepared by reacting an isocyanate terminated prepolymer with a chain extender. The chain extender links multiple diisocyanate terminated prepolymers, e.g., chain extends or cures the prepolymer, to form the resultant polyurethane elastomer. In many prepolymer/chain extender reactions, however, the cure rate is slow, necessitating high cure temperatures and resulting in decreased productivity and inferior polyurethane elastomers.

The present invention relates to accelerating the chain extending reaction by incorporating an organic salt, e.g., a nitrogen-containing organic salt, with the prepolymer. The organic salt accelerates the cure rate, e.g., chain extension rate, of the prepolymer/chain extender reaction, relative to the same prepolymer/chain extender reaction without the organic salt. In particular, the invention relates to the use of nitrogen-containing organic salts (or compounds) in the prepolymer mixture. The organic salt in the prepolymer mixture provides for accelerated cure rates, e.g., accelerated by at least 10%, e.g. at least 25%, at least 40%, at least 50%, at least 75%, at least 100%, or at least 200%, of the prepolymer/chain extender reaction, when compared to the same reaction run under the same reaction conditions but in the absence of the organic salt. In terms of cure time, the organic salt accelerates, i.e., reduces, cure time by at least 10 minutes, e.g., at least 15 minutes, at least 25 minutes, at least 45 minutes, or at least 60 minutes, when compared to the same reaction run under the same reaction conditions but in the absence of the organic salt. Preferably, the prepolymer in the prepolymer mixture is reacted with a metal salt coordination complex of methylenedianiline ("MDA") to form a high performance polyurethane (as discussed infra).

Thus, the organic salt-containing prepolymer mixtures of the present invention may be utilized, e.g., via the inventive methods, to produce inventive polyurethane elastomers. By incorporating the organic salts in the prepolymer mixture, and hence in the polyurethane reaction mixture, the cure time in which the polyurethane elastomers are formed may be significantly reduced. As such processing parameters, e.g., cure temperatures and/or cycle times may be decreased, thus increasing overall productivity. In addition, the quality of the resultant polyurethane elastomer, e.g., the consistency of structure throughout the resultant polyurethane elastomer, may be improved.

Prepolymer Mixture

As indicated above, polyurethane elastomers are typically prepared by reacting a prepolymer with a chain extender, e.g., a curative. As used herein, the term "prepolymer mixture" refers to any mixture comprising a prepolymer. The prepolymer preferably is formed from the reaction of one or more, e.g., two or more, three or more, or four or more, diisocyanate monomers with one or more, e.g., two or more, three or more, or four or more, polyols. The reaction of the diisocyanate monomer and the polyol preferably is conducted with excess molar amounts of diisocyanate monomer. Hence, in some embodiments, the prepolymer mixture may further comprise unreacted diisocyanate monomers, referred to herein as "free diisocyanate monomers." The polyurethane prepolymers may, for example, be obtained by reacting the polyol with, the diisocyanate monomer via procedures known in the art. (See, for example, U.S. Published Patent Application No. 2003/0065124, filed Aug. 2, 2001, the entirety of which is incorporated herein by reference). In addition, according to various embodiments of the invention, the prepolymer mixture preferably comprises one or more organic salts, e.g., nitrogen containing organic salts, which accelerate curing of the prepolymer when reacted with a chain extender.

Organic Salt

In addition to prepolymer, as indicated above, the prepolymer mixtures of the present invention preferably comprise one or more organic salts. As used herein, "organic salt" is defined as a compound comprising a Group 3A, 4A, 5A, or 6A core atom. Preferably, the core atom is a Group 5A or 6A compound, e.g., nitrogen, phosphorus, or sulfur. The inclusion of the organic salt in the prepolymer mixture accelerates curing of the elastomer, e.g., provides for a prepolymer that is rapidly curable. That is, the prepolymers, when reacted with the chain extender in the presence of an organic salt, cure more quickly than it would in the absence of the organic salt. As one example, the inclusion of the organic salt in the prepolymer mixture provides for at least a 10% improvement, e.g., at least 25% improvement, at least a 40% improvement, at least a 50% improvement, at least a 75% improvement, at least a 100% improvement, or at least a 200% improvement, in cure rate, as compared to the same reaction run under the same reaction conditions but in the absence of an organic salt. Cure rate may be defined as the time ("hardness build-up" time) necessary to achieve a polyurethane elastomer Shore A hardness of at least 25 A, e.g., at least 35 A, at least 50 A, at least 60 A, at least 70 A, at least 80 A, at least 90 A, or at least 100 A. For example, the cure rate may be measured by preparing a reaction mixture comprising the prepolymer mixture and a chain extender at a temperature of at least 40° C., at least 50° C., at least 75° C., or at least 100° C., and then pouring the mixture into a container, e.g., a mold, and heating the reaction mixture to a temperature of at least 75° C., at least 100° C., at least 125° C., or at least 150° C. The Shore A hardness may be measured as the reaction progresses. In terms of ranges, the mixing temperature of the prepolymer mixture and the chain extender may range from 25° C. to 125, e.g., from 25° C. to 100° C., or from 25° C. to 75° C., and the heating temperature may range from 50° C. to 200, e.g., from 75° C. to 150° C., or from 75° C. to 125° C. In addition, cure rate may also be determined by rheological measurements, such as, for example, Bingham plastic fluid parameters, plastic viscosity, and yield point.

Without being bound by theory, the organic salts present in the inventive prepolymer mixtures react with the MDA coordination complex to facilitate de-blocking the MDA. Once de-blocked, the MDA is able to effectively chain extend the prepolymer in the prepolymer mixture. By reacting with the MDA coordination complex, the organic salts promote de-blocking of the MDA. Typically, e.g., without the organic salts, such de-blocking must be initiated by heating, e.g., at higher temperatures or for, longer times, as compared to when the organic salt is employed. This is typically done by heating a mold that contains the prepolymer and the chain extender. By de-blocking the salt complexes, the organic salts advantageously allow the prepolymer to be chain extended with less heating and/or within a shorter time, which results a more effective production process. As a result, de-mold time may be reduced (by, for example, at least a 10%, at least 25%, at least 40%, at least 50%, at least 75%, at least 100%, or at least 200%), and overall production efficiency may be significantly improved.

In addition to these processing benefits, the ability of the organic salts to accelerate the cure rate of the prepolymer/chain extender reaction mixture beneficially provides for a more uniform cure of the resultant elastomer. Conventionally, the prepolymer mixture/chain extender reaction mixture will cure most rapidly where heat is applied, e.g., at the surface of the mold. As such, a hard skin may form on the outer surface of the elastomer initially. As the cure slowly progresses, the inner volume of the elastomer may expand, which, in turn, may cause the skin to crack or rupture and form undesirable surface defects. Thus, in preferred embodiments, the inclusion of the organic salt in the prepolymer mixture advantageously yields urethane elastomers that are substantially flat, e.g., substantially without fissures, and substantially free, e.g., completely free, of surface defects such as cracks.

The organic salt may vary widely. Preferably, the organic salt is a nitrogen-containing organic salt, e.g., an ammonium salt (optionally a quaternary ammonium salt), an imidazolium salt, a pyridinium salt, a pyrrolidinium salt, a piperidinium salt, or a morpholinium salt. Alternatively, the organic salt is not exclusively a nitrogen-containing organic salt and is one or more organic salts selected from the group consisting of an ammonium salt, an ammonium halide, a phospholipid, an ammonium phosphate, an imidazolium salt, a phosphonium salt, and a diorganic salt polydialkyl siloxane. Preferably, one or more of these compounds are quaternary compounds. As mentioned above, it is also contemplated that other organic salts, e.g., Group 3A compounds (for example, borate compounds), Group 4A compounds (for example, guanidinium compounds), Group 5A compounds (for example, phosphonium compounds), or Group 6A compounds (for example, sulfonium compounds) may be utilized along with or in place of the nitrogen-containing organic salt. Preferably, the organic salt is a quaternary ammonium halide, e.g., a quaternary ammonium chloride.

As an example, the organic salt preferably corresponds to the formula:

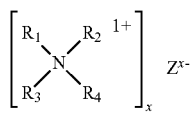

wherein $R_1$-$R_4$ are the same or different and are independently selected from alkyl and aryl groups, Z is an anion, and x is 1 or 2, preferably 1. Preferably, the R groups are alkyl of 1 to 38, e.g., 1-24, carbons or said alkyl interrupted by one or more hetero atoms, for example the R groups may be one or more of methyl, ethyl, propyl, butyl, hexyl, octyl, etc., such as derived from, e.g., fatty amines, or polyoxyethyl groups, or polyoxypropyl groups.

Alternatively, the organic salt may correspond to one or more of the following formulae:

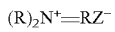

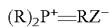

where the R groups are independently the same or different or are connected to form a ring and are independently selected from alkyl and aryl groups and Z is an anion.

Optionally, the nitrogen-containing organic salt may be utilized along with or be replaced by a sulfonium compound corresponding to the following formulae:

where the R groups are the same or different or are connected to form a ring and are independently selected from alkyl and aryl groups and Z is an anion.

Commercial organic salts that may be included in the prepolymer mixture may include, but are not limited to, diethyl polypropoxy methylammonium chlorides such as Variquat® CC-42 NS and Variquat® CC-9 NS, diethyl polypropoxy 2-hydroxyethyl ammonium phosphates such as Variquat® CC-59, imidazoilium salts such as 1-H imidazoilium sulfates Variquat® 56 and Varisoft® 3639, from Evonik Industries AG, Germany, and 1-ethyl-3-methylimidazolium chloride from BASF, NJ, USA, salts comprising polysiloxanes such as Tegopren® 6924 from Evonik Industries AG, Germany, phospholipid (lecithin) from Central Soya, phosphonium chlorides such as Cyphos® IL 101 from Cytec, IN, USA. The preferred commercial organic salt is Variquat® CC-42 NS.

In one embodiment, the organic salt is present in the prepolymer mixture in an effective amount to obtain the above-identified reduction in cure rate. Optionally, the prepolymer mixture comprises the organic salt in a minor amount with the remainder of the prepolymer mixture, e.g., the isocyanate terminated prepolymer (the reaction product of the diisocyanate monomer and the polyol), being present in a major amount. Alternatively, the organic salt is present in an amount ranging from 0.01 wpph to 100 wpph, e.g., from 0.01 wpph to 20 wphh, from 0.1 wpph to 10 wpph or from 0.5 wpph to 5 wpph. As used herein, "wpph" is parts per hundred of the entire prepolymer mixture. In addition, the organic salt may be present in greater amounts, e.g., in amounts ranging from 0.05 wt % to 25 wt %, from 0.01 wt % to 20 wt %, or from 0.1 wt % to 10 wt %, based on the total weight of the prepolymer mixture.

As one example, the organic salt may have a Brookfield viscosity, measured at 25° C., of greater than 5 cps, e.g., greater than 10 cps, greater than 20 cps, or greater than 50 cps. In terms of ranges, the organic salt may have a Brookfield viscosity, measured at 25° C., ranging from 1 cps to 50,000 cps, e.g., from 500 cps to 20,000 cps or from 1,000 cps to 10,000 cps. Alternatively, the organic salt is solid.

Diisocyanate

As indicated above, the prepolymer in the prepolymer mixture is preferably formed from the reaction between an isocyanate monomer (preferably diisocyanate monomer) and a polyol. Thus, the prepolymer mixture also optionally comprises a minor amount of an isocyanate monomer (e.g., free isocyanate monomer). The isocyanate may be any isocyanate, e.g., aliphatic diisocyanates or aromatic diisocyanates. Typical aliphatic diisocyanates include 1,6-hexane diisocyanate (HDI), isophorone diisocyanate (IPDI), and methylene bis (p-cyclohexyl isocyanate) ($H_{12}$MDI). Typical aromatic diisocyanates include diphenylmethane diisocyanate ("MDI"), optionally polymeric MDI, toluene diisocyanate ("TDI"), naphthalene diisocyanate (NDI), 3,3'-bitoluene diisocyanate (TODI), diphenyl 4,4'-diisocyanate ("DPDI"), tetramethylxylylene diisocyanate ("TMXDI"), and para-phenylene diisocyanate (PPDI).

Suitable commercial products include the pure 4,4'-diphenylmethane diisocyanate isomer (e.g., Mondur M P, Bayer) and as a mixture of isomers (e.g., Mondur M L, Bayer and Lupranate MI, BASF). The most preferred form is the pure-4,4'-isomer.

Optionally the level of free diisocyanate in the prepolymer mixture may be at a reduced level, e.g., the prepolymer mixture may be a "low free" diisocyanate prepolymer mixture, e.g., free diisocyanate levels of less than 25 wt %, less than 10 wt %, less than 5 wt %, less than 3 wt %, less than 1 wt %, or less than 0.5 wt %. As an example, free diisocyanate in the prepolymer mixture may be removed by distillation as is known in the art.

Any distillation equipment can be used in the distillation. For example, an agitated film distillation system commercialized by Pope Scientific, Inc.; Artisan Industries, Inc.; GEA Canzler GmbH & Co.; Pfaudler-U.S., Inc.; InCon Technologies, L.L.C.; Luwa Corp.; UIC Inc.; or Buss-SMS GmbH, may be used. Continuous units with internal condensers are preferred because they can reach lower operating vacuums of 0.001 to 1 torr.

It is practical to, optionally, strip the excess diisocyanate, e.g., MDI, and solvent at a pressure around 0.04 torr and at a temperature between about 120° C. and about 175° C., although stripping at 0.02 torr or below and 140° C. or below may generate the best results. The importance of minimizing high temperature degradation of pre-polymers from aromatic diisocyanate monomers is described in U.K. Pat. No. 1,101,410, which recommends that distillation be conducted under vacuum with an evaporative temperature preferably under 175° C. U.S. Pat. No. 4,182,825 describes the use of evaporative jacket temperatures of 150-160° C. for TDI pre-polymers. U.S. Pat. No. 5,703,193 recommends a jacket temperature of 120° C. The above references are incorporated herein by reference in their entireties.

It is typically desirable that, in the operation of agitated film distillation equipment, the condenser temperature for the distillate be at least about 50° C., e.g., at least about 100° C., below the evaporative temperature. This provides a driving for the rapid and efficient evaporation, then condensation, of the distillate. Thus, to distill off MDI monomer at an evaporator temperature of 140° C. or lower (to avoid thermal decomposition of the pre-polymer), a condenser temperature of 40° C. or below is desirable. Since neat MDI has a melting point of about 40° C., a higher condenser temperature is required to prevent solidification of the MDI in the condenser. The use of a solvent permits condensation at lower temperatures, e.g., 30° C. or lower. Thus, the use of a solvent makes possible the use of lower evaporator temperatures, thereby avoiding thermal decomposition of the pre-polymer.

The resultant product, (prepolymer mixture) may contain less than 0.1% solvent and about 0.1 to about 0.3% MDI after one pass, and the distillate can come out clean and remain transparent at room temperature. The distillate may then be reused to produce more pre-polymer. Monomeric MDI level can drop down to less than 0.1% after two or three passes. This is in sharp contrast to the non-solvent process described in U.S. Pat. No. 5,703,193, in which the free MDI level is reduced from an estimated starting level of about 57% to 21%, 3.0%, and 0.7% after the first, second, and third passes, respectively, when carried out under similar, conditions.

In such procedures, the molar ratio of diisocyanate to polyol may be, for example, in the range of from 1.5:1 to 20:1. For diphenylmethylene diisocyanate (MDI)-based prepolymers, the molar ratio of MDI to polyol may be from 2.5:1 to 20:1. For a toluene diisocyanate (TDI)-based prepolymer, the molar ratio of TDI to polyol may be from 1.5:1 to 4:1. The diisocyanate and polyol preferably are reacted at a temperatures of at least 30° C., e.g., at least 50° C. or at least 70° C. In terms of ranges, the reaction temperature may range from 30° C. to 120° C., e.g. 50° C. to 110° C.

Polyol

The polyol that is reacted with the isocyanate to form the prepolymer in the prepolymer mixture, and which may be present in the prepolymer mixture in a minor amount, may be any suitable polyol. Preferably, however, the prepolymer mixture is substantially free of polyol since the diisocyanate is ideally provided in excess relative to the polyol. As a result, substantially all of the polyol preferably is reacted with the isocyanate monomer as the prepolymer is formed.

Exemplary polyols include polyether, polyester, polycarbonate, polycaprolactone, and/or hydrocarbon polyols. In various embodiments, the polyol may comprise one or more of a polyether, a polyester, or a polycaprolactone, preferably having a molecular weight (MW) ranging from 200 to 6000, e.g., from 400 to 3000 or from 1000 to 2500. In this context, molecular weight refers to the number average molecular weight in Daltons. Exemplary polyols include polyester of adipic acid, polyether of ethylene oxide, polyether of propylene oxide, polyether of tetrahydrofuran, polycaprolactone, polycarbonate, hydrocarbon polyol, and mixtures thereof. As one example, the polyols may comprises glycols or triols having molecular weights from about 60 to about 400, e.g., from about 80 to about 300 or from about 100 to about 20. Such glycols or triols include ethylene glycol, isomers of propylene glycol, polypropylene glycol, optionally EO-capped polypropylene glycol, isomers of butane diol, hexanediol, trimethylolpropane, pentaerythritol, poly(tetramethylene ether) glycol, diethylene glycol, triethylene glycol, dipropylene glycol, tripropylene glycol, and mixtures thereof. In addition, the polyol may be the reaction products of adipic acid, succinic acid, isophthalic acid and other difunctional or multifunctional carboxylic acids with glycols, examples of which include ethylene glycol, 1,3 propane diol, butane diol, hexanediol, and 1,3 butanediol. In one embodiment, the polyol may be a diol, triol, tetrol, or higher hydroxyfunctional polyol. In addition, the polyol includes compositions wherein a certain percentage of the polyol is a mono-ol. For example, the hydroxy functionality preferably ranges from 1.8 to 4.0, e.g., from 1.9 to 3.0.

Preferably, the polyols utilized to form the prepolymer have lower degrees of functionality. As an example, the prepolymer mixture may include a polyol (or mixture of polyols) having an overall functionality no higher than 5, e.g., no higher than 4, no higher than 3, no higher than 2. In some cases, by utilizing such a polyol, excessive cross linking may reduced. Excessive cross linking may have a negative effect on elastomer properties such as, for example, flex fatigue, tear, and abrasion resistance. In contrast, the polyols utilized in conventional flexible foam producing processes typically utilize highly functionalized polyols, e.g., polyols having an overall functionality of at least 4, e.g., at least 5 or at least 6. Because flexible foams are produced via an entirely different process, a high degree of functionality is often necessary. In some embodiments of the present invention, however, lower functionalities are desired.

The polyols may be synthesized according to methods known in the art. For example, polyether polyols can be synthesized using a double metal cyanide catalyst as disclosed in U.S. Pat. No. 6,953,765, the entire contents and disclosure of which is hereby incorporated by reference.

In one embodiment, a polyurethane prepolymer comprises a plurality of polyols. Such embodiments may have a polyurethane prepolymer with two polyols, each having a molecular weight greater than 500, e.g., greater than 1,000 or greater than 2,000. Such embodiments may also have a polyurethane prepolymer with three polyols, two of which having a molecular weight greater 500, e.g., greater than 1,000 or greater than 2,000. Such embodiments may also have a polyurethane prepolymer with a polyol having a high molecular weight and a glycol or triol having a lower molecular weight than the polyol.

Representative polyols that may be used to form the prepolymer include polypropylene glycol (PPG) such as ACCLAIM 4220 (MW of 4037), ACCLAIM 3201 (MW of 3074), and ARCOL R-2744 (MW of 2240), from Lyondell Chemical Company; PPG diol polymer from propylene oxide ("PPG 4000"), PPG-EO diol (copolymer from propylene oxide and ethylene oxide) ("PPG-EO 3000"), PPG diol ("PPG 2000"); poly(ethylene adipate) glycol (PEAG) such as PEAG 1000 (MW of 980) from Chemtura, PEAG 2000 (MW of 1990) from Chemtura, PEAG 2500 (MW of 2592) from Ruco Polymer Corp.; poly(trimethylolpropane ethylene adipate) glycol (PTEAG), poly(tetramethylene ether) glycol (PTMEG), such as Terathane™ 1000 (MW of 994), and Terathane™ 2000 from DuPont.

Prepolymer Mixture, Generally

In preferred embodiments, the prepolymer mixtures of the present invention may be used to form polyurethane elastomers in casting systems. Alternatively, the prepolymer mixtures may be used in a Reaction Injection Molding ("RIM") system. Such casting systems react prepolymer mixtures with chain extenders to form polyurethane elastomers and/or polyurethane-urea elastomers. In contrast, conventional processes for making polyurethane foams, e.g., flexible foams as described in U.S. Pat. No. 7,005,458, do not utilize a prepolymer mixture, as defined herein. Such conventional foams instead are prepared in a fixed head foam machine. The polyol component and the other additive ingredients (for example, catalysts, blowing agents, and anti-static agents) are mixed together, and the resulting mixture is introduced along with the polyisocyanate component into the mixing head to be combined. The resultant mixture is poured into a container and allowed to rise. As such, the foam is formed in situ upon combination of the various reactants. Thus, unlike the present invention, in which the (low functionality) isocyanate terminated prepolymer is preferably blended with the organic salt prior to polymerization (chain extension), the (high functionality) polyisocyanate of conventional foam systems only mixes with the polyol and additives during polymerization, i.e., no prepolymer mixture containing an organic salt is formed in the conventional processes. Thus, conventional foam forming processes do not employ a prepolymer composition that comprises a prepolymer and an organic salt, as is utilized in the prepolymer mixtures of the present invention. Further, in typical foam forming processes, it is generally desired to keep the polyisocyanate as pure as possible to avoid or minimize side reactions with the isocyanate groups, which can cause the foam forming properties of the system to change. Thus, with conventional foam forming processes, it would be disadvantageous to blend additives with the polyisocyanate component.

Because the resultant elastomers of the present invention are, desirably, substantially nonporous, the inventive prepolymer mixtures (and the chain extenders used therewith) preferably do not contain blowing agents, surfactants, or water.

The prepolymer mixture may have a Brookfield viscosity, measured at 25° C., greater than 500 cps, e.g., greater than 1,000 cps, greater than 2,000 cps, or greater than 5,000 cps. In terms of ranges, the prepolymer mixture may have a Brookfield viscosity, measured at 25° C., ranging from 1 cps to 100,000 cps, from 10 cps to 50,000 cps, from 10 cps to 100,000 cps, from 500 cps to 20,000 cps or from 1,000 cps to 10,000 cps. The prepolymer mixture optionally has a high viscosity at room temperature, which may be reduced upon heating. In one aspect, the prepolymer is in a solid state at room temperature.

Suitable commercial isocyanate terminated prepolymers, which may have the organic salt blended therein, include Adiprene® LF, Adiprene® LFG, Adiprene® LFM and Adiprene® LFP, Adiprene® LFP 950A, Adiprene® L 167, Adiprene® L 300, Adiprene® LF 800 A, Adiprene® L 950A, Adiprene® L 1800A, Adiprene® LFM 500, Adiprene® LFM 2400; Adiprene® LFM 2450, Adiprene® LFM 1451, Adiprene® LFM 1300, Adiprene® LFP 950A, Adiprene® LFH 520, Vibrathane® B 625, Vibrathane® B 8030, Vibrathane® B 8585, Vibrathane® B 8086, Vibrathane® B 8045, S850, S900 by Chemtura Corporation, CT, USA.

In preferred embodiments, the prepolymer mixture is one which, upon chain extending with a suitable chain extender provides a high performance polyurethane elastomer. Such high performance polyurethane elastomers are discussed below.

Chain Extenders

As mentioned above, polyurethane elastomers are prepared by reacting a prepolymer, as described above, with a chain extender (curative). The chain extender may be any suitable chain extender for curing the prepolymer. As an example, the chain extender may comprise, for example, water, diols, triols, diamines, triamines, or their mixtures. The chain extender optionally has a high viscosity at room temperature, which may be reduced upon heating. Optionally, the chain extender is in a solid state at room temperature.

Representative diol chain extenders suitable for use in the present invention include 1,4-butanediol (BDO), resorcinol d (beta-hydroxyethyl)ether (HER), resorcinol di(beta-hydroxypropyl)ether (HPR), hydroquinone-bis-hydroxyethyl ether (HQEE), 1,3-propanediol, ethylene glycol, 1,6-hexanediol, and 1,4-cyclohexane dimethanol (CHDM); triols and tetrols, such as trimethylol propane and triethanolamine; and adducts of propylene oxide and/or ethylene oxide having molecular weights in the range of from about 190 to about 500, e.g., about 250 to about 400, such as various grades of Voranol™ (Dow Chemical), Pluracol™ (BASF Corp.) and Quadrol™ (BASF Corp.). Preferably, the chain extender is a methylenedianiline (MDA)-sodium chloride coordination complex.

The MDA metal salt coordination complexes have a tendency to be decomposed by diol or polyol solution. Typically, prepolymer mixtures are made with excess isocyanate, which minimizes active hydroxy groups. Preferably, in cases where MDA metal salt coordination complexes are utilized as the chain extender, the elastomer mixture is substantially free of additional diols or polyols that may be contained in additives, e.g., anti-static agents that contain diol or polyol mixtures such as Cataphor® PU from Rhodia, FR.

As one example, the chain extender has a Brookfield viscosity, measured at 25° C., ranging from 1 cps to 20,000 cps, e.g., from 1 cps to 10,000 cps, from 100 cps to 10,000 cps, from 1,000 cps to 10,000 cps, or from 1,000 cps to 5,000 cps.

Suitable commercial chain extenders include 4,4'-methylene-bis(3-chloro-2,6-diethylaniline) (MCDEA); diethyl toluene diamine (DETDA); Ethacure™ 100 from Albemarle Corporation; tertiary butyl toluene diamine (TBTDA); dimethylthio-toluene diamine (Ethacure™ 300 from Albemarle Corporation); trimethylene glycol di-p-amino-benzoate (Vibracure™ A157 from Chemtura Corporation, or Versalink™ 740M from Air Products and Chemicals); methylenedianiline (MDA); Duracure™ from Chemtura Corporation; halogenated aromatic diamines, halogentated diaromatic diamines, such as methylene bis orthochloroaniline (MOCA); and methylene bis diethylanaline (MDEA). Preferably, the chain extender is a methylenedianiline metal salt coordination complex, more preferably a blocked methylenedianiline sodium salt coordination complex coordination complex dispersed in dioctyl adipate.

Chain extenders may be used alone to cure the polyurethane prepolymer, or alternatively, may be mixed with low to moderate amounts of hydroxy or amine terminated polyol to make a mixed curative. Addition, of such hydroxy or amine terminated polyols has the effect of increasing the equivalent weight of the curative blend, as well as of softening the final polyurethane article that is molded. While this can be beneficial either when improved ratios are desired for easier mixing, or when low hardness is needed, the use of such polyols is known in the art to compromise physical and dynamic properties. Therefore, use of such hydroxy or amine terminated polyols is preferably limited to less than 50 mole % e.g. less than 30 mole %, or less than 20 mole % of the curative mixture.

The molar ratio of prepolymers to curatives, for example, may be in the range of from 1:2 to 3:1, e.g., from 0.7:1 to 1.2:1 or from 1.1:1 to 0.9:1. The amount of curative may also be calculated by the following formula:

$$C_{100p} = \frac{(\text{NCO \%})(C_{ew})(\% \text{ Theory})}{4202}$$

where $C_{100p}$ is the parts curative per 100 parts prepolymer, NCO % is percent of NCO content of the prepolymer, $C_{ew}$ is the equivalent weight of the curative, and % Theory is the stoichiometry for the curative. Thus, for example, the calculated amount of a curative with an equivalent weight of 133.5 and 95% stoichiometry cured with a prepolymer having 4.1 NCO % would be 12.4 parts of curative per 100 parts prepolymer on a mass basis.

Elastomers

In addition to the inventive prepolymer mixtures, the present invention also relates to a polyurethane elastomer comprising the reaction product of the prepolymer (from the prepolymer mixture) and the chain extender, where the prepolymer and chain extender are reacted with one another in the presence of the organic salts described above, e.g., nitrogen containing organic salt. In these applications, the organic salt may be present in the polyurethane elastomer in an amount ranging from 0.01 wppm to 20 wppm, e.g., from 0.01 wppm to 10 wppm, or from 1 wppm to 10 wppm, based on the total weight of the polyurethane elastomer.

As a result of employing such prepolymer mixtures, the resultant elastomers cure at an accelerated rate. In addition to the improvements in cure rate discussed above, the elastomers preferably achieve a Shore A hardness greater than 20 A, e.g., greater than 30 A or greater than 40 A, after a minimum of 15 minutes, e.g., a minimum of 20 minutes, a minimum of 30 minutes, or a minimum of 40 minutes, of heating at a temperature of 100° C. Alternatively, the elastomers achieve a Shore A hardness greater than 30 A, e.g., greater than 40 A or greater than 50 A, after a minimum of 40 minutes, e.g. a minimum of 50 minutes, a minimum of 60 minutes, or a minimum of 70 minutes, of heating at a temperature of 100° C.

In a preferred embodiment, the elastomer of the present invention is the reaction product of the prepolymer mixture reacted with a chain extender, where the chain extender is a methylenedianiline metal salt coordination complex. The cure time for such elastomers to reach a Shore A hardness of at least 30 A, e.g., at least 40 A, at least 50 A, at least 60 A, at least 70 A, at least 80 A, or at least 90 A, is accelerated by at least 10%, e.g., at least 25%, at least 50%, or at least 100%, relative to the same reaction run at the same reaction conditions but in the absence of an organic salt.

The inventive elastomers, preferably, have a density greater than 0.24 g/cm³, greater than 0.32 g/cm³, greater than 0.40 g/cm³, or greater than 0.48 g/cm³. As such, the elastomers are clearly distinguished from the foams generated via conventional foaming processes.

As discussed above, the addition of the organic salt to the prepolymer mixture advantageously yields urethane elastomers that are substantially free, e.g., completely free, of surface defects, e.g., cracks. The urethane elastomers may have a substantially flat surface that is substantially free, e.g., completely free, of visible cracks. Preferably, the inventive elastomers are substantially free of defects having a depth of greater than 10 mm, e.g., greater than 5 mm, greater than 3 mm, greater than 1 mm, or greater than 0.5 mm, with the depth being measured from the surface of the elastomer inward toward the center. Alternatively, the inventive elastomers are substantially tree of defects that are greater than 10 mm, e.g., greater than 5 mm, greater than 3 mm, greater than 1 mm, or greater than 0.5 mm, in length.

As indicated above, the inventive elastomers are preferably high performance elastomers defined herein as an elastomer having a Shore A durometer hardness of at least 25, at least 35, at least 50, at least 60, at least 70, at least 80, at least 90, or at least 100. The corresponding ASTM test for Shore A hardness is designated ASTM D2240 00, the entirety of which is incorporated herein by reference. Another exemplary property of many high performance polyurethane elastomers is high Trouser Tear values. Generally, tear properties are a function of hardness. The corresponding ASTM test is designated ASTM D-1938, the entirety of which is incorporated herein by reference. The polyurethane elastomers, having a hardness Shore A ranging from 20 A to 120 A, e.g., from 20 A to 100 A or from 30 A to 80 A, may have a high (improved) Trouser Tear value of at least 100 kg/cm (550 lbf/in), e.g., at least 108 kg/cm (600 (lbf/in), or at least 120 kg/cm (670 lbf/in). In addition, the inventive elastomers may show improvements in Trouser Tear value of greater than 10%, e.g., greater than 25% or greater than 50%, over elastomers that do not utilize a prepolymer mixture that comprises a organic salt. An additional exemplary property of the inventive elastomers is high Split Tear values. The corresponding ASTM test is designated ASTM D470, the entirety of which is incorporated herein by reference. The polyurethane elastomers of the present invention preferably demonstrate a Split Tear value increase of at least 10%, e.g., at least 20% or at least 50%. In addition, the inventive elastomers may show an improvement in Split Tear value of greater than 10%, e.g., greater than 25% or greater than 50%, over elastomers that do not utilize a prepolymer mixture that comprises a organic salt.

In addition, the elastomers that have significantly faster cure times may also have modulus, elongation and peak stress values as compared to conventional elastomers having slower cure times. As such, the inventive elastomers are produced in less time, which beneficially results in a significant improvement in process productivity.

Examples of uses for such high performance urethane elastomers include: high performance tires, wheels, belts, scraper blades, mining screens, die cutting pads, pump parts, bearings, bushings, springs, track pads, abrasive pads, seals, and suspension parts for railroad, automotive, and heavy duty equipment.

In one embodiment, the elastomers of the present invention have lower color values, e.g., the elastomers demonstrate low Yellowness Index ("YI") values. The addition of the organic salt may provide an improvement in color value, e.g., improvements of at least 10%, at least 20%, at least 30%, or at least 50%. As an example, the elastomers may have a Yellowness Index of less than 50, e.g., less than 35 or less than 20.

Optionally, the elastomer is substantially free of an antistatic agent, e.g., contains less than 10 wt %, less than 5 wt %, or less than 1 wt. % static agent Method In addition to the inventive prepolymer mixtures and polyurethane elastomers, the invention also relates to a method of preparing a polyurethane elastomer. The method comprises combining the isocyanate terminated prepolymer and the organic salt to form the prepolymer mixture and reacting the prepolymer in the prepolymer mixture with the chain extender to form the polyurethane elastomer. The resultant polyurethane elastomers have the properties and characteristics discussed above. Preferably, in the inventive method, the reaction product of the prepolymer and the chain extender is not a foam. The elastomer ideally does not require the use of antistatic additives because the elastomer contains metal salt. The metal salt makes the elastomer more hydroscopic and resistant to the build up of a static charge. In contrast, polyurethane foams are generally less hydroscopic and more susceptible to the build up of static charge and more likely to require the use of antistatic additives. Thus, compared with foam elastomers, the elastomers of the present invention preferably are more conductive and should not require the inclusion of any anti-static agents.

The amounts of the components utilized in the method as well as preparation parameter for the prepolymer mixture are as described above in relation to the prepolymer mixture and the chain extender. In addition, the reaction of the prepolymer mixture and the chain extender may be conducted at a temperature of at least 50° C., e.g., at least 75° C., at least 100° C., at least 125° C., or at least 150° C. Further, the reaction of the prepolymer mixture and the chain extender may be conducted at a pressure of at least 0.1 atm, e.g., at least 0.5 atm, or at least 1.0 atm. The prepolymer, organic salt, the chain extender may be mixed in stirred tank at less than 100° C., preferably less than 70° C. The resulting mixture is then charged to a container, e.g., a mold (optionally a heated mold) where the MDA coordination complex is de-blocked and polymerization to a polyurethane elastomer occurs.

EXAMPLES

Embodiments of the invention will become more evident in view of the following non-limiting examples.

Example 1

Preparation of Various Prepolymer Mixtures

To determine cure rate of a prepolymer mixture/chain extender combination, various prepolymer mixtures were prepared. Table 1 shows the prepolymer mixtures of Examples 1A-1H, which were prepared using Adiprene® LFM 500 as the isocyanate terminated prepolymer. To the Adiprene® LFM 500, 1.0 pph of various organic salts were added.

TABLE 1

Prepolymer Mixtures

| Example | Organic salt, 1.0 phr | Description | Isocyanate Terminated Prepolymer |
|---|---|---|---|
| 1A | Control | — | Adiprene ® LFM 500 |
| 1B | Variquat CC-42 NS | Quaternary Ammonium Chloride | Adiprene ® LFM 500 |
| 1C | Lecithin | Phospholipid | Adiprene ® LFM 500 |
| 1D | Variquat CC-9 NS | Quaternary Ammonium Chloride | Adiprene ® LFM 500 |
| 1E | Variquat CC-59 | Quaternary Ammonium Phosphate | Adiprene ® LFM 500 |
| 1F | Variquat 56 | Imidazolinum sulfate | Adiprene ® LFM 500 |
| 1G | Tegopren 6924 | Diorganic salt Polydimethyl Siloxane | Adiprene ® LFM 500 |
| 1H | Varisoft 3696 | Imidazolinum sulfate | Adiprene ® LFM 500 |

The prepolymer mixtures of TABLE 1 were heated to 50° C. A chain extender, 44% methylenedianiline sodium chloride coordination complex dispersed in dioctyl adipate, was added with mixing. The resultant reaction mixture was poured into a hardness cup and placed in a temperature controlled forced convection oven at 100° C. The degree of the cure of these samples was measured, as a function of time, by measuring Shore A hardness (using a Shore A durometer). TABLE 2 shows the cure rates (hardness build-ups) for the reaction mixtures. The final hardness, was measured after 16 hours at 100° C. and cooling to room temperature for at least six hours.

TABLE 2

Cure Rates

| Time, min. | Hardness 1A | Hardness 1B | Hardness 1C | Hardness 1D | Hardness 1E | Hardness 1F | Hardness 1G | Hardness 1H |
|---|---|---|---|---|---|---|---|---|
| 10 | Liquid | Liquid | Liquid | Skin | Liquid | Liquid | 63A | Liquid |
| 20 | Skin* | Soft | Skin | Skin | Skin | 68A | 69A | 84A |
| 30 | Soft** | 56A | 34A | 67A | Soft | 93A | 71A | 93A |
| 40 | Soft | 69A | 40A | 86A | 35A | 94A | 73A | 94A |
| 50 | Soft | 78A | 58A | 91A | 44A | 95A | 74A | 95A |
| 60 | Soft | 88A | 66A | 94A | 57A | 94A | 75A | 95A |
| 16 h. | 95A | 95A | 95A | 95A | 87A | 95A | 67A | 95A |

*Skin-only a skin was formed at the outer edges of the sample.
**Soft-sample had a soft, "cheesy" consistency.

As shown in TABLE 2, the addition of the organic salt significantly accelerated the cure of the prepolymer mixture/chain extender reaction mixture Surprisingly and unexpectedly, the addition of the organic salt to the prepolymer mixture reduces the time to achieve a Shore A hardness of 30 A to minimally 30 minutes. Without the organic salt, the same Shore A hardness level is not achieved until well after 60 minutes.

Example 2

Additional samples utilizing polyether-based isocyanate terminated prepolymers were prepared in the same manner as Example 1, but using different isocyanate terminated prepolymers. TABLE 3 shows the components of Examples 2A-2H.

TABLE 3

Prepolymer Mixtures

| Example | Organic salt, 1.0 phr | Description | Isocyanate Terminated Prepolymer |
|---|---|---|---|
| 2A | Control | — | Adiprene ® LF 950A |
| 2B | Variquat CC-42 NS | Quaternary Ammonium Chloride | Adiprene ® LF 950A |
| 2C | Control | — | Adiprene ® L300 |
| 2D | Variquat CC-42 NS | Quaternary Ammonium Chloride | Adiprene ® L300 |
| 2E | Control | — | Adiprene ® LFP 950A |
| 2F | Variquat CC-42 NS | Quaternary Ammonium Chloride | Adiprene ® LFP 950A |
| 2G | Control | — | Adiprene ® LFH 520 |
| 2H | Variquat CC-42 NS | Quaternary Ammonium Chloride | Adiprene ® LFH 520 |

The prepolymer mixtures of TABLE 3 were heated to 50° C. 44% methylenedianiline sodium chloride coordination complex dispersed in dioctyl adipate, was added with mixing. The resultant reaction mixture was poured into a hardness cup and placed in a temperature controlled forced convection oven at 100° C. The degree of the cure of these samples was measured, as a function of time, as performed in Example 1. TABLE 4 shows the cure rates (hardness build-ups) for the reaction mixtures. Again, the final hardness was measured after 16 hours at 100° C. and cooling to room temperature for at least six hours.

TABLE 4

Cure Rates

| Time, min. | Hardness 2A | Hardness 2B | Hardness 2C | Hardness 2D | Hardness 2E | Hardness 2F | Hardness 2G | Hardness 2H |
|---|---|---|---|---|---|---|---|---|
| 15 | Liquid | Liquid | Liquid | Soft | Liquid | Soft | 54A | Soft |
| 20 | Liquid | Skin | Soft | Soft | Liquid | Soft | 58A | 62A |
| 25 | Liquid | Soft | Soft | 58A | Skin | Soft | 73A | 83A |
| 30 | Skin | 54A | 53A | 72A | Soft | Soft | 85A | 90A |
| 35 | Skin | 73A | 69A | 79A | Soft | Soft | 87A | 90A |
| 40 | Soft | 78A | 81A | 85A | Soft | 40A | 91A | 92A |
| 45 | Soft | 80A | 87A | 86A | Soft | 54A | 90A | 91A |
| 50 | 62 | 83A | 87A | 88A | Soft | 62A | 92A | 93A |
| 55 | 69 | — | 86A | 88A | Soft | — | 92A | 92A |
| 60 | 78 | 87A | 88A | 89A | Soft | 80A | 90A | 90A |
| 16 h. | 92 | 92A | 90A | 90A | 93A | 93A | 94A | 94A |

As shown in TABLE 4, the addition of the organic salt significantly accelerates the cure of the prepolymer mixture/chain extender. Surprisingly and unexpectedly, in most cases, the addition of the organic salt to the prepolymer mixture reduced, the time to achieve a Shore A hardness of 40 A to minimally 40 minutes. When compared to prepolymer mixtures without organic salt, the inventive prepolymers improve cure time by at least 15 minutes in most cases.

Example 3

Additional samples utilizing MDI-polyester-based isocyanate terminated prepolymers were prepared in the same manner as Example 1, but using different isocyanate terminated prepolymers. TABLE 5 shows the components of Examples 3A-3H.

TABLE 5

Prepolymer Mixtures

| Example | Organic salt, 1.0 phr | Description | Isocyanate Terminated Prepolymer |
|---|---|---|---|
| 3A | Control | — | S850 *** |
| 3B | Variquat CC-42 NS | Quaternary Ammonium Chloride | S850 |
| 3C | Control | — | S900 |
| 3D | Variquat CC-42 NS | Quaternary Ammonium Chloride | S900 |
| 3E | Control | — | Adiprene ® LFM 1451**** |
| 3F | Variquat CC-42 NS | Quaternary Ammonium Chloride | Adiprene ® LFM 1451 |
| 3G | Control | — | Adiprene ® LFM 1300 |
| 3H | Variquat CC-42 NS | Quaternary Ammonium Chloride | Adiprene ® LFM 1300 |

*** S850 and S900 are MDI terminated PBHAG prepolymers (copolymer of butanediol, hexanediol, and adipic acid.
****LFM 1300 is an MDI terminated PEAG prepolymer (polymer of adipic acid and ethylene glycol).

The prepolymer mixtures of TABLE 5 were heated to 70° C. 44% methylenedianiline sodium chloride coordination complex dispersed in dioctyl adipate, was added with mixing. The resultant reaction mixture was poured into a hardness cup and placed in a temperature controlled forced convection oven at 100° C. The degree of the cure of these samples was measured, as a function of time, as performed in Example 1. TABLE 6 shows the cure rates (hardness build-ups) for the reaction mixtures. Again, the final hardness was measured after 16 hours at 100° C. and cooling to room temperature for at least six hours.

TABLE 6

| Cure Rates | | | | | | | | |
|---|---|---|---|---|---|---|---|---|
| Time, min. | Hardness 3A | Hardness 3B | Hardness 3C | Hardness 3D | Hardness 3E | Hardness 3F | Hardness 3G | Hardness 3H |
| 15 | Skin | 56A | Liquid | Soft | Liquid | Liquid | Skin | 83A |
| 20 | Skin | 83A | Liquid | Soft | Liquid | Skin | Soft | 87A |
| 25 | 74A | 81A | Skin | 64A | Skin | Soft | Soft | 87A |
| 30 | 82A | 82A | Soft | 85A | Skin | Soft | — | 88A |
| 35 | 79A | 80A | Soft | 87A | Skin | Soft | 84A | 88A |
| 40 | 82A | 81A | Soft | 88A | Soft | Soft | 88A | 88A |
| 45 | 81A | 82A | Soft | 88A | Soft | Soft | 87A | 88A |
| 50 | 83A | 82A | 40-60A | 88A | Soft | Soft | 87A | 89A |
| 55 | 82A | 81A | 40-60A | 89A | Soft | Soft | 87A | 89A |
| 60 | 83A | 83A | 40-60A | 89A | Soft | 76A | 87A | 89A |
| 16 h. | 86A | 86A | 90A | 90A | No Cure | 92A | 89A | 92A |

As shown in TABLE 6, the addition of the organic salt significantly accelerate the cure of the prepolymer mixture/chain extender reaction mixture. Surprisingly and unexpectedly, in most cases, the addition of the organic salt to the prepolymer mixture reduced the time to achieve a Shore A hardness of 60 A to minimally 20 minutes. When compared to prepolymer mixtures without organic salt, the inventive prepolymers improve cure time by at least 20 minutes in most cases.

Example 4

Synergy with Methylenedianiline Sodium Chloride Coordination Complex

TABLE 7 demonstrates a synergistic effect, achieved with the organic salt and the methylenedianiline sodium chloride coordination complex, as compared to an aromatic diamine, methylenebis(2-chloroaniline) ("MOCA"). Adiprene® L300 was heated to 50° C., blended with Variquat CC-42 NS, then heated to 80° C. and mixed with molten MOCA. The resultant reaction mixture was poured into a hardness cup and placed in a temperature controlled forced convection oven at 100° C. The degree of the cure of these samples was measured, as a function of time, as performed in Example 1. A control, which did not include the Variquat CC-42 NS organic salt, was also prepared and tested. The results are shown in TABLE 8.

TABLE 8

| Cure Rates with MOCA chain extender | | |
|---|---|---|
| Time, min. | Hardness-no organic salt | Hardness-with organic salt |
| 5 | Liquid | Liquid |
| 10 | Soft | Soft |
| 15 | 50A | 46A |
| 20 | 64A | 64A |
| 25 | 73A | 71A |
| 30 | 76A | 76A |
| 35 | 79A | 79A |
| 40 | 80A | 80A |
| 45 | 82A | 82A |
| 50 | 83A | 81A |
| 55 | 84A | 82A |
| 60 | 85A | 84A |
| 16 h. | 91A | 91A |

As shown in TABLES 2, 4, 6, and 8, the addition of the organic salt to the prepolymer mixture, when utilized with the methylenedianiline sodium chloride coordination complex provides for accelerated cure rates. TABLE 8 shows that, with some conventional diamine chain extenders, these results are not demonstrated to the same extent. Thus, surprisingly and unexpectedly, the combination of the methylenedianiline sodium chloride coordination complex and the inventive prepolymer mixture clearly demonstrates a synergistic effect that could not have been predicted.

Example 5

Improved Tear Values

TABLE 9 shows the physical properties of an elastomer prepared by reacting E530D (with various levels of organic salt) with the methylenedianiline sodium chloride coordination complex. as compared to an aromatic diamine, methylenebis(2-chloroaniline) ("MOCA"). Adiprene® L300 was heated to 50° C., blended with Variquat CC-42 NS, then heated to 80° C. and mixed with molten MOCA. The resultant reaction mixture was poured into a hardness cup and placed in a temperature controlled forced convection oven at 100° C. The degree of the cure of these samples was measured, as a function of time, as performed in Example 1. A control, which did not include the Variquat CC-42 NS organic salt, was also prepared and tested. The results are shown in TABLE 9.

TABLE 9

| Physical Properties of Elastomers | | | |
|---|---|---|---|
| | Example 5A-no organic salt | Example 5B-2 phr organic salt | Example 5C-5 phr organic salt |
| Modulus 10% (psi) | 1334 | 1292 | 1426 |
| Modulus 25% | 1894 | 1822 | 1967 |
| Modulus 100% | 2235 | 2164 | 2339 |
| Modulus 300% | 2460 | 2333 | 2475 |
| Elongation % | 604 | 654 | 629 |
| Peak Stress (psi) | 5014 | 5046 | 4678 |
| Trouser Tear | 526 | 649 | 600 |

As shown in TABLE 9, surprisingly and unexpectedly, the addition of the organic salt to prepolymer mixture provides for significant improvements in Trouser Tear values for elastomers prepared therewith. In addition, by utilizing the inventive prepolymer mixtures, elastomer that have significantly faster cure times as well as comparable modulus, elongation and peak stress values may be produced. As such, comparable elastomers can be produced in less time, which results in a significant improvement in process productivity.

Any feature described or claimed with respect to any disclosed implementation may be combined in any combination with any one or more other feature(s) described or claimed with respect to any other disclosed implementation or implementations, to the extent that the features are not necessarily technically incompatible, and all such combinations are within the scope of the present invention. Furthermore, the claims appended below set forth some non-limiting combinations of features within the scope of the invention, but also contemplated as being within the scope of the invention are all possible combinations of the subject matter of any two or more of the claims, in any possible combination, provided that the combination is not necessarily technically incompatible.

What is claimed is:

1. A prepolymer mixture for preparing a polyurethane elastomer, comprising:
   (a) an isocyanate terminated prepolymer which is the reaction product of a diisocyanate and a polyol;
   (b) from 0.5 to 5 parts per hundred, based on the entire weight of the prepolymer mixture, of an imidazolium chloride or sulfate salt; and
   (c) a methylenedianiline metal salt coordination complex chain extender.

2. The prepolymer mixture of claim 1, wherein the nitrogen-containing organic salt is present in an amount of at least 1 part per hundred based on the weight of the isocyanate terminated prepolymer.

3. The prepolymer mixture of claim 1, wherein the prepolymer mixture comprises less than 0.5 weight percent residual isocyanate monomer.

4. The prepolymer mixture of claim 1, wherein the diisocyanate is selected from the group consisting of toluene diisocyanate, diphenylmethane diisocyanate, para-phenylene diisocyanate, naphthalene diisocyanate, DPDI, 1,6-hexane diisocyanate, isophorone diisocyanate, methylene bis (p-cyclohexyl isocyanate), 3,3'-bitoluene diisocyanate, diphenyl 4,4'-diisocyanate, tetramethylxylylene diisocyanate, and polymeric MDI.

5. The prepolymer mixture of claim 1, wherein the polyol is a polyether polyol selected from the group consisting of poly(tetramethylene ether) glycol, polypropylene glycol, and polyethylene glycol.

6. The prepolymer mixture of claim 1, wherein the polyol is a polyester polyol reaction product of adipic acid, succinic acid, or isophthalic acid with one or more glycols.

7. The prepolymer mixture of claim 1, wherein the isocyanate terminated prepolymer has a Brookfield viscosity, measured at 25° C., ranging from 10 centipoise to 100,000 centipoise.

8. A polyurethane elastomer comprising the reaction product of an isocyanate terminated prepolymer and a methylenedianiline metal salt coordination complex chain extender in the presence of an imidazolium chloride or sulfate salt, wherein the nitrogen-containing organic salt is present in the polyurethane elastomer in an amount ranging from 1 to 10 parts per hundred based on the total weight of the elastomer.

* * * * *